US009322512B2

(12) United States Patent
Bremer et al.

(10) Patent No.: US 9,322,512 B2
(45) Date of Patent: Apr. 26, 2016

(54) FLUID STORAGE MANAGEMENT SYSTEM AND METHOD FOR MONITORING FLUID CAPACITIES AND FOR CONTROLLING THE TRANSFER OF FLUID CAPACITIES WITHIN A FLUID NETWORK

(75) Inventors: Marco Bremer, Erlangen (DE); Martin Kletscher, Wilhelmsdorf (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 392 days.

(21) Appl. No.: 13/811,930

(22) PCT Filed: Jul. 22, 2011

(86) PCT No.: PCT/EP2011/062640

§ 371 (c)(1), (2), (4) Date: Jan. 24, 2013

(87) PCT Pub. No.: WO2012/019898

PCT Pub. Date: Feb. 16, 2012

(65) Prior Publication Data

US 2013/0126015 A1 May 23, 2013

(30) Foreign Application Priority Data

Aug. 9, 2010 (DE) ......................... 10 2010 033 754

(51) Int. Cl.

| | |
|---|---|
| ***G06F 19/00*** | (2011.01) |
| ***F17D 3/00*** | (2006.01) |
| ***F17D 1/04*** | (2006.01) |

(52) U.S. Cl.

CPC .. *F17D 3/00* (2013.01); *F17D 1/04* (2013.01); *Y10T 137/7287* (2015.04)

(58) Field of Classification Search

CPC ............ G05D 11/132; G05D 23/1927; C02F 2209/42; C02F 2209/006; C02F 2209/40; E03B 1/04; E03B 1/042; E03B 7/075; E03B 7/04; E03B 11/02; E03B 7/02; E03B 11/04; E03B 11/06; E03B 3/00; E03B 7/00; E03B 2001/045; E03B 2001/047; G01F 23/0061; G01F 25/0061; A01G 27/02; F16K 31/385; F16K 21/18; F16K 31/18; F16K 31/34

See application file for complete search history.

(56) References Cited

U.S. PATENT DOCUMENTS

| | | | | |
|---|---|---|---|---|
| 5,940,290 | A | 8/1999 | Dixon | |
| 6,325,093 | B1 * | 12/2001 | Ooshima | 137/392 |

(Continued)

FOREIGN PATENT DOCUMENTS

| | | | |
|---|---|---|---|
| DE | 60316694 | T2 | 7/2008 |
| DE | 102006061734 | A1 | 7/2008 |

(Continued)

*Primary Examiner* — Darrin Dunn

(57) ABSTRACT

A fluid-reservoir management system for monitoring fluid capacities and controlling the transfer of fluid capacities within a fluid network includes a plurality of linked fluid reservoirs for storing the fluid capacities, a central computer unit in a communication network, the fluid reservoirs being linked to the communication network for transmitting data to and from the central computer unit, a communication portal provided in the communication network, a user interface for accessing the communication portal, a comparison unit for comparing fluid capacities and for comparing parameters of the fluid reservoirs and of the fluid network, and a control device for executing orders to transfer fluid capacities between at least two fluid reservoirs. The central computer unit coordinates the orders to transfer fluid capacities between at least two fluid reservoirs as a function of results of comparisons performed by the comparison unit and forwards the orders to the control device for executing.

17 Claims, 4 Drawing Sheets

(56) References Cited

U.S. PATENT DOCUMENTS

| | | | | |
|---|---|---|---|---|
| 6,831,564 | B2 | 12/2004 | Bair, III | |
| 7,284,244 | B1 * | 10/2007 | Sankaranarayan et al. | 718/104 |
| 8,024,239 | B2 * | 9/2011 | Shirazi | 705/30 |
| 2005/0085928 | A1 * | 4/2005 | Shani | 700/18 |
| 2007/0254196 | A1 | 11/2007 | Chapman | |
| 2007/0258834 | A1 | 11/2007 | Froloff | |
| 2008/0082215 | A1 | 4/2008 | McDowell | |
| 2009/0216452 | A1 * | 8/2009 | Nance et al. | 702/5 |
| 2010/0076615 | A1 | 3/2010 | Daniel | |
| 2010/0299517 | A1 * | 11/2010 | Jukic et al. | 713/150 |
| 2011/0082570 | A1 * | 4/2011 | Caffrey et al. | 700/90 |
| 2011/0290329 | A1 * | 12/2011 | Garza et al. | 137/2 |
| 2012/0022992 | A1 * | 1/2012 | Odom et al. | 705/37 |
| 2012/0038661 | A1 * | 2/2012 | Rissanen | 345/592 |

FOREIGN PATENT DOCUMENTS

| | | | |
|---|---|---|---|
| DE | 102008058736 | B3 | 8/2010 |
| JP | 2009070147 | A | 4/2009 |
| RU | 2003124588 | A | 2/2005 |

* cited by examiner

FLUID STORAGE MANAGEMENT SYSTEM AND METHOD FOR MONITORING FLUID CAPACITIES AND FOR CONTROLLING THE TRANSFER OF FLUID CAPACITIES WITHIN A FLUID NETWORK

CROSS REFERENCE TO RELATED APPLICATIONS

This application is the US National Stage of International Application No. PCT/EP2011/062640, filed Jul. 22, 2011 and claims the benefit thereof. The International Application claims the benefits of German application No. 10 2010 033 754.4 DE filed Aug. 9, 2010. All of the applications are incorporated by reference herein in their entirety.

FIELD OF INVENTION

The invention relates to a fluid-reservoir management system for transferring fluid capacities and controlling the transfer of fluid capacities within a fluid network. The invention relates further to a method for monitoring fluid capacities and controlling the transfer of fluid capacities within a fluid network.

BACKGROUND OF INVENTION

Through regulating of the gas market, the requirements to be met in terms of managing gas reservoirs for providing gas for seasonal operations are tending increasingly toward "gas on demand". That means it should be possible for the gas to be called up and made available at any time. Accompanying that is a growing need to automate gas reservoirs such that switchover times between the operating modes "store" and "withdraw" as well as "withdraw with compression" will be minimized. For the required amounts of gas, information about the gas reservoirs must furthermore be available so that in keeping with their levels of availability and respectively current operating modes a judgment can be made about the possible amount of gas that can be stored or withdrawn.

Gas reservoirs currently serve to even out the high demand for gas in winter months by feeding out gas. The amounts of gas conveyed have as a rule hitherto been provided at a day's notice to the gas provider by telephone or e-mail. That means there will nearly always be a negative margin of delay between dispatching the order and processing it because processing the order, for example the ordering of a certain amount of gas, is performed manually. A problem frequently experienced by utility companies is that the available amounts of gas cannot be stored or withdrawn in a timely manner. The activity of gas trading is greatly restricted by conventional communication media such as, for instance, telephone, fax, or e-mail and is often inefficient.

SUMMARY OF INVENTION

It is hence the object of the invention to improve the monitoring of fluid capacities and controlling of the transfer of fluid capacities within a fluid network. The aim in particular is for the monitoring of fluid capacities, the processing of orders—such as orders for fluid capacities and the transfer thereof—and controlling of the transfer of fluid capacities to take place in realtime and in a structured manner.

Said object is inventively achieved by the features of the independent claim(s). Other features and specifics of the invention will emerge from the subclaims, the description, and the drawings. Features and specifics described in connection with the inventive fluid-reservoir management system therein of course also apply in connection with the inventive method, and respectively vice versa, so that references relating to the disclosure of individual aspects of the invention are always reciprocal.

The object is achieved according to the first aspect of the invention by means of a fluid-reservoir management system for monitoring fluid capacities and controlling the transfer of fluid capacities within a fluid network. The fluid-reservoir management system therein has a multiplicity of fluid reservoirs for storing the fluid capacities, with the fluid reservoirs being linked to each other in the fluid network for transferring fluid capacities. The fluid-reservoir management system furthermore has a central computer unit provided in a communication network, with the fluid reservoirs being linked to the communication network for transmitting data to and from the central computer unit. The fluid-reservoir management system furthermore has a communication portal provided in the communication network, with the communication portal being linked to the central computer unit. It is possible to access the communication portal via a user interface for accessing the communication portal, with the communication portal being embodied for conveying orders to the central computer unit within the scope of accessing. The fluid-reservoir management system furthermore has a comparison unit for comparing fluid capacities and for comparing parameters of the fluid reservoirs and of the fluid network. A control device is embodied for executing orders to transfer fluid capacities between at least two fluid reservoirs, with it being possible to enter the orders via the communication portal's user interface. The central computer unit is further embodied for coordinating the orders to transfer fluid capacities between at least two fluid reservoirs as a function of results of comparisons performed by the comparison unit and for forwarding the orders to the control device for executing.

A thus embodied fluid-reservoir management system will make improved monitoring of fluid capacities possible as well as improved controlling of the transfer of fluid capacities within a fluid network. Realtime monitoring of fluid capacities can be performed by the fluid-reservoir management system. The processing of orders, such as orders for fluid capacities and the transfer thereof, can take place in realtime and in a structured manner. Users of the fluid-reservoir management system can, for example, check their own fluid reservoirs, meaning their fluid capacities and parameters such as, for example, fill levels or operating statuses, and also view the fluid capacities and parameters of other fluid reservoirs of other operators. After an order has been entered or, as the case may be, received, the fluid-reservoir management system is furthermore able to forward it in realtime and initiate the transfer of fluid capacities between at least two fluid reservoirs.

Central to the fluid-reservoir management system is the linking up of a multiplicity of fluid reservoirs, especially gas reservoirs, in which the fluid, especially gas, has been or can be stored. The multiplicity of fluid reservoirs are linked within a fluid network, with it being possible for the fluid capacities to be exchanged between the different fluid reservoirs via pipelines. Further at the heart of the fluid-reservoir management system is the central computer unit in the communication network. The central computer unit and the fluid reservoirs are interconnected in the communication network so that data can be transmitted between each fluid reservoir and the central computer unit. All information about the fluid reservoirs converges within the central computer unit.

The communication portal, which is provided in the communication network, is linked to the central computer unit so that the data administered or processed by the central computer unit can be viewed via the communication portal. The communication portal is accessed via a user interface. That means that orders can be entered and forwarded to the central computer unit via the communication portal's user interface. The communication portal is embodied for conveying orders to the central computer unit within the scope of accessing. The central computer unit accepts orders for processing.

The comparison unit, which is in particular connected to the central computer unit or forms part of the central computer unit, compares the various fluid reservoirs' fluid capacities or compares the parameters of the fluid reservoirs and of the fluid network with each other. What is understood as a fluid reservoir within the meaning of the invention is also a pipeline between two fluid reservoirs. When orders have been received, the central computer unit forwards the orders to transfer fluid capacities between at least two fluid reservoirs to the fluid-reservoir management system's control device as a function of results of comparisons performed by the comparison unit. The orders to transfer fluid capacities are executed via the control device, which means the control device forwards control signals to the relevant fluid reservoirs, which then executes the orders.

An advantage of the fluid-reservoir management system is that users of the fluid-reservoir management system immediately obtain information about all the fluid reservoirs linked to the fluid-reservoir management system's fluid network, as a result of which decisions can easily be made about assigning orders. When an order has been entered into the fluid-reservoir management system or, as the case may be, the fluid-reservoir management system's central computer unit, the customer will be aware of all the conditions such as, for example, the prices charged for the fluid capacities, the delivery times of the fluid capacities, the pressures at which the fluid capacities will be delivered, and the storage capacities of his/her own and other fluid reservoirs.

The fluid-reservoir management system's communication portal makes a visual representation possible of the fluid network's data converging within the central computer unit. Users are able to dial into the communication portal and gain access to all presented data via a user interface such as a personal computer, a PDA, or a cell phone, for instance. Via the communication portal, users are shown, for example, what fluid reservoirs there are in the fluid network. Alongside their own fluid reservoirs if, for example, they are also a regional fluid provider, they will see all the fluid reservoirs of the other users, in particular those of fluid suppliers. The communication portal displays to users what fluid capacities there are in the fluid network. The communication portal furthermore shows users all the parameters within the fluid network, for example the operating statuses of fluid reservoirs, possible rates of flow of fluid capacities through pipelines between two fluid reservoirs, amounts of fluid in the fluid reservoirs, pressures of the fluid capacities within the various fluid reservoirs, and, for example, also prices of the fluid capacities in the various fluid reservoirs. Users can assign orders on the basis of that information, being able, for example, to order fluid capacities that are to be transferred to their own fluid reservoirs. Thus they can enter orders via the communication portal's user interface. Said orders will be conveyed to the central computer unit, which coordinates the orders to transfer fluid capacities between at least two fluid reservoirs as a function of results of comparisons performed by the comparison unit and forwards the orders to the fluid-reservoir management system's central computer unit for executing. That means that in conjunction with the comparison unit the central computer unit determines the extent to which the orders that have been entered can be executed. The central computer unit can in particular process orders autonomously, meaning, for example, that it can determine when and from where fluid capacities will be transferred between fluid reservoirs and in what amounts. Thus, for example, the central computer unit can determine after the receipt of an order that a certain fluid capacity A will be delivered from a first fluid reservoir and a certain fluid capacity B will be delivered from a second fluid reservoir into the customer's fluid reservoir. Transferring of the fluid capacities can therein commence either immediately or at a later time.

According to a preferred development of the invention it can be provided for the fluid-reservoir management system to be embodied for monitoring and controlling the transfer of fluid capacities, particularly gas capacities, from first fluid reservoirs belonging to fluid suppliers to second fluid reservoirs belonging to fluid recipients. An advantage of the fluid-reservoir management system is that both the customer and the order recipient are connected to the fluid-reservoir management system's central computer unit. That will enable an automated exchange of fluid capacities within the fluid network, to which exchange both the customer and the order recipient are bound. That means that the recipient of an order, for example a fluid supplier, will be bound to it having received it. If another customer wishes to order a certain fluid capacity from the same fluid supplier, the central computer unit will in conjunction with the comparison unit check whether the second order can be fulfilled at all, meaning whether the fluid supplier's fluid reservoir has sufficient fluid capacities to meet the second order. The fluid-reservoir management system's central computer unit will immediately inform the customer if the second order cannot be fulfilled so that the customer will be able to inquire about an alternative solution straight away.

A fluid-reservoir management system is furthermore preferred in which the central computer unit is embodied for preventing cases of underbooking and/or overbooking fluid capacities in the fluid reservoirs by means of reports from the comparison unit. That means that the central computer unit is able to process orders in an anticipatory manner. If having determined that a specific order cannot be fulfilled because, for example, a selected fluid reservoir does not have sufficient fluid capacity, meaning a sufficient amount of fluid, the comparison unit will inform the central computer unit so that it can provide the customer with relevant feedback. Immediately reporting the comparison unit's results means that the central computer unit will always know the current fluid capacities and parameters within the fluid reservoirs or fluid network. Thus the fluid-reservoir management system's central computer unit will obtain all information about all the fluid reservoirs connected within the fluid network. That means the central computer unit will know all the fill levels, pressures, and operating statuses of the fluid reservoirs and of the pipelines between the fluid reservoirs. An operating status is, for example, information about whether a fluid reservoir is in the process of being emptied, in the process of being filled, or is currently inactive.

According to a particularly preferred development of the invention it can be provided in the fluid-reservoir management system for the communication portal to be embodied as an intranet portal or internet portal that can be addressed via web interfaces. If the communication portal is embodied as an intranet portal, then all users who are specially authorized will be able to access the fluid-reservoir management system. If the communication portal is embodied as an internet portal, meaning if access is public and open to anyone, then a greater number of users will have easy access to the communication portal. It is, though, advantageous for users to have a user ID or, as the case may be, authentication for accessing the communication portal. Misuse within the communication portal or, as the case may be, fluid-reservoir management system can be prevented thereby. An advantage of the internet portal is that it can be accessed via all kinds of user interfaces. Thus it can be accessed via, for example, a computer unit, in particular a personal computer. It can alternatively be accessed via a mobile-radio-network provider's mobile-radio network. In particular the internet portal will enable both the providers of amounts of fluid and the recipients of amounts of fluid, meaning customers wishing to obtain fluid capacities, in particular gas capacities, to access the fluid-reservoir management system and hence all information within the fluid network at any time.

Fluid reservoirs of the fluid-reservoir management system can be variously embodied. The fluid reservoirs are preferably overground and/or underground fluid reservoirs. Underground fluid reservoirs can in particular be caverns, gas caverns in the case of gas. It is furthermore possible for, for example, fluid-storage tanks such as, for instance, gas tanks, to serve as fluid reservoirs. Also regarded as fluid reservoirs in the light of the invention are the links that are provided between the fluid reservoirs and via which the fluid capacities can be exchanged. Said links are in particular pipelines. Transportation means via which fluid capacities can be exchanged in a mobile manner can further be regarded as fluid reservoirs. Said transportation means can be, for example, trucks having suitable fluid tanks as well as other vehicles such as, in particular, tankers. The fluid-reservoir management system's central computer unit can when calculating orders take account of fluid reservoirs of such kind or, as the case may be, the parameters of fluid reservoirs of such kind such as, for instance, storage capacities, as well as the length of transportation time.

A multiplicity of statuses and data are used as parameters of the fluid reservoirs and fluid network. The parameters of the fluid reservoirs and fluid network can be, for instance, pressures, fill levels, operating statuses, qualities of the fluid capacities, flow rates through pipelines, and amounts entering and leaving the fluid reservoirs. The parameters can in particular be restrictions applying to the fluid reservoirs and pipelines linked to the fluid network in terms of their maximum pressure or maximum storage volume that can be accommodated.

The fluid-reservoir management system is embodied preferably such that as a function of the results of the comparison of the actual status of the fluid reservoirs with their future desired conditions that can be calculated on the basis of the orders placed the central computer unit instructs the control device to control the transfer of fluid capacities within a fluid network. The central computer unit can selectively instruct the control device for transferring fluid capacities based on the comparison of all fluid reservoirs' actual status with a fluid reservoir's future desired conditions conveyed in an order. Thus the central computer unit can, for example, instruct the control device to the effect that it will control different fluid reservoirs for transferring fluid capacities to a fluid reservoir belonging to the customer.

The orders that can be entered into the fluid-reservoir management system's communication portal via the user interface can be variously embodied. The orders are preferably bookings, transfer orders, and/or reservations for fluid capacities. Bookings are as a rule placed via the communication portal by end customers who need specific fluid capacities, in particular amounts of gas. It is, though, also conceivable for intermediaries to send bookings for fluid capacities to wholesalers, or, as the case may be, gas suppliers. Transfer orders are, for example, orders which a wholesaler or gas supplier sends to regional gas operators or end customers. Orders can furthermore also be reservations for fluid capacities, in which reservations a specific fluid capacity is ordered for delivery at a certain future time.

According to another preferred development of the invention it can be provided in the fluid-reservoir management system for the central computer unit to be embodied for receiving in parallel orders that arrive simultaneously or mutually overlap and for the control device to be embodied for executing the orders simultaneously or in an overlapping fashion. That means the central computer unit will be able to process a plurality of orders in parallel, with the other orders being taken into account while one order is being processed. The order that arrives first is preferably also processed first. If, for example, a certain reservoir's fluid capacity is exhausted after a first order has been processed, then it will not be possible to transfer any fluid capacity from said reservoir to the customer when the second order is processed. The customer who placed the second order cannot be supplied from said fluid reservoir until the relevant reservoir has been replenished. The central computer unit will advantageously report directly to the customer indicating the extent to which the relevant order can be met and when. The orders can for their part be embodied such as to include a request for a fluid capacity to be supplied from a specific fluid reservoir. In the absence of any such order expressly specifying the fluid reservoir from which the customer wishes to obtain, for example, gas, the central computer unit will in collaboration with the comparison unit seek out the relevant fluid reservoirs from which gas can be transferred. What is consequently preferred is a fluid-reservoir management system in which the central computer unit is embodied such that from the multiplicity of fluid reservoirs linked to the fluid network it will select those that are suitable for executing an order. The central computer unit for that purpose fetches the results from the comparison unit. Being constantly up-to-date about the fluid network's fluid capacities and parameters, the fluid-reservoir management system's central computer unit can flexibly determine or, as the case may be, calculate how the relevant orders are to be processed. The orders will, though, as a rule be formulated sufficiently specifically for the central computer unit to have only certain fluid reservoirs available for the order from the multiplicity of fluid reservoirs. Restrictions that may therein apply include the price of the fluid capacities or, as the case may be, the customer's wish to work with a specific supplier.

It is furthermore advantageous in the fluid-reservoir management system for the communication network to include bus systems, in particular Profibus or Modbus systems, via which the fluid reservoirs and central computer unit communicate with each other. Other transmission systems are, though, also possible. Ethernet connections and mobile-radio networks are particular options for transmitting the data between the fluid reservoirs and central computer unit. In particular the bus systems will enable the orders and the parameters of the respective fluid reservoirs or, as the case may be, all the parameters in the fluid network to be transmitted in realtime.

According to another advantageous development of the invention it can be provided in the fluid-reservoir management system for there to be two or more fluid-reservoir management systems that are monitored and controlled by a superordinate coordinating center having at least one coordinating-computer unit linked to the two or more fluid-reservoir management systems' central computer units. A superordinate coordinating center of such kind will make it possible to coordinate two or more fluid-reservoir management systems' fluid capacities. Thus, for example, a first fluid-reservoir management system embodied as previously can be operated in a first geographical region and a second fluid-reservoir management system can be operated in a second geographical region. The superordinate coordinating center will be able to coordinate the exchange of fluid capacities between the two fluid-reservoir management systems in keeping with what is required and necessary.

It is furthermore advantageous for a fluid-reservoir management system's central computer unit or, as the case may be, a superordinate coordinating system's central computer unit and the corresponding communication portals to be operated by an independent enterprise. Independent therein means that the operating enterprise does not itself operate any fluid reservoirs or, as the case may be, procure any fluid capacities.

According to a second aspect of the invention, the object is achieved by means of a method for monitoring fluid capacities and controlling the transfer of fluid capacities within a fluid network, with a multiplicity of fluid reservoirs in which fluid capacities can be stored being linked to each other in the fluid network for transferring fluid capacities. The method is therein characterized by the following steps of the method:

a) Data, especially data relating to the fluid reservoirs' and fluid network's fluid capacities and parameters, is transmitted between the fluid reservoirs and central computer unit over a communication network that links the fluid reservoirs and central computer unit to each other, b) fluid capacities and parameters of the fluid reservoirs and fluid network are monitored and orders to transfer fluid capacities between at least two fluid reservoirs are entered via a user interface of a communication portal connected to the communication network's central computer unit, c) a comparison unit compares the fluid reservoirs' and fluid network's fluid capacities and parameters with each other and forwards the comparison results to the central computer unit, d) as a function of the results of the comparison performed by the comparison unit, the central computer unit coordinates the orders to transfer fluid capacities between at least two fluid reservoirs and forwards the orders to the control device for executing, e) a control device executes the orders received from the central computer unit to transfer fluid capacities between at least two fluid reservoirs.

A method of such kind makes simple and much faster monitoring of fluid capacities within a fluid network possible as well as allowing the transfer of fluid capacities within the fluid network to be controlled simply and quickly. Users of the method will, without any time delay in the communication portal, be able to call up data relating to fluid capacities and parameters of all fluid reservoirs and place their orders accordingly. Since all parties participating in this method or, as the case may be, the fluid-reservoir management system are advantageously bound to their information presented over the communication portal, every user of the method will be able to work out precisely when and how much fluid capacity can be supplied and at what price. Both the customer and the order recipients will, once an order has been submitted, be bound to the parameters applying at the time of submission so that every user of the method can be certain that the orders will be fulfilled accordingly. That means that if, say, the price of the fluid, gas in particular, were to increase four hours after an order had been placed, the customer would obtain the fluid for the price applying at the time of the order.

An advantage of the method is that all data relating to the fluid reservoirs or, as the case may be, fluid network arrives in the central computer unit via the communication network linking the fluid reservoirs and central computer unit to each other. That enables the central computer unit always to have been informed about the current status and currently applicable parameters of all fluid reservoirs. Thus the central computer unit will know, for example, the status of every fluid reservoir. Thus a fluid reservoir can, for example, be in the process of being replenished with new fluid capacities or, as the case may be, fluid capacities can be in the process of being withdrawn. It is furthermore possible for a fluid reservoir currently to be at a standstill, meaning for it to have a certain fluid capacity that is unchanged. The status of each fluid reservoir and the parameters and conditions applying to each fluid reservoir can be viewed and hence monitored by the users on a user interface of the communication portal. The method makes what is termed "fluid trading", in particular "gas trading", possible in a particularly simple manner, with each user being informed about the conditions currently prevailing in the fluid network. The parameters or conditions of the fluid network or fluid reservoirs are different. What are conceivable as parameters are in particular the operating condition, meaning the operating statuses of the fluid reservoirs and of the pipelines linking the fluid reservoirs to each other, the possible flow rates, the prices of the fluids, the fluid delivery times, the maximum pressures, and so forth.

Users of the method can each access the communication portal on a user interface facing them, meaning they can place orders to transfer fluid capacities between at least two fluid reservoirs. The comparison unit compares the current fluid capacities and relevant parameters of the fluid reservoirs with each other and forwards the results of the comparisons to the central computer unit, which on the basis of the results of the comparisons performed by the comparison unit then processes or, as the case may be, coordinates the orders. Before an order is executed it can be provided for the central computer unit to furnish the customer with feedback on how it plans to process the order. With the customer's consent, the central computer unit forwards the orders for executing to the control device, which then initiates the relevant steps necessary for transferring the required fluid capacity. The central computer unit advantageously will not execute the orders unless the customer agrees. Depending on how the order is specifically embodied, it can, though, also be provided for the central computer unit to forward the orders to the control unit without informing the customer again.

It is preferred for a fluid-reservoir management system according to the first aspect of the invention to be used for implementing the method.

According to a preferred development of the invention it can be provided in the method for the user who entered the order to receive a notification via the user interface after an order has been entered via the user interface and/or on completion of a transfer of at least one fluid capacity from one fluid reservoir to another fluid reservoir. The customer or, as the case may be, user will thereby at all times be informed about the order's status and can be certain that the order will be duly fulfilled.

A method is furthermore preferred in the case of which as a function of the fluid reservoirs' fluid capacities and parameters and of existing orders the central computer unit calculates times when a new order can be executed, with overbooking and/or underbooking of fluid capacities in the fluid reservoirs being avoided. That is achieved in particular through the central computer unit at any time knowing the current status of all fluid reservoirs and of all pipelines via the communication network or through the comparison unit. In particular through the comparison of the fluid reservoirs' fluid capacities and parameters it is ensured that the central computer unit will not overbook or, as the case may be, underbook fluid capacities in the fluid reservoirs. Before an order is forwarded to the control unit, the central computer unit checks the extent to which the execution of any order is possible. Because data is optimally transmitted between the fluid reservoirs and central computer unit in realtime, the central computer unit will always be up-to-date with the conditions prevailing in the fluid network and on the basis of said information can via the comparison unit perform comparisons necessary for calculating so that the existing orders will be processed appropriately. Users will obtain immediate feedback indicating the extent to which the orders can be fulfilled. Should it not be possible to execute an order in the manner required by the customer, the central computer unit will be able to propose an alternative solution to the customer or, as the case may be, the central computer unit will provide the customer with feedback indicating that the order cannot be fulfilled in said manner.

According to a particularly preferred development of the invention it can be provided in the method for providers of fluid capacities, for example fluid suppliers, and buyers of fluid capacities, for example end customers or regional fluid providers, to be able to access the communication network's communication portal simultaneously and mutually independently via different user interfaces in order to monitor the fluid reservoirs' and fluid network's current fluid capacities and parameters and submit orders.

BRIEF DESCRIPTION OF THE DRAWINGS

The invention and its developments as well as the advantages thereof will be explained in more detail below with the aid of schematics.

DETAILED DESCRIPTION OF INVENTION

Figure 1:
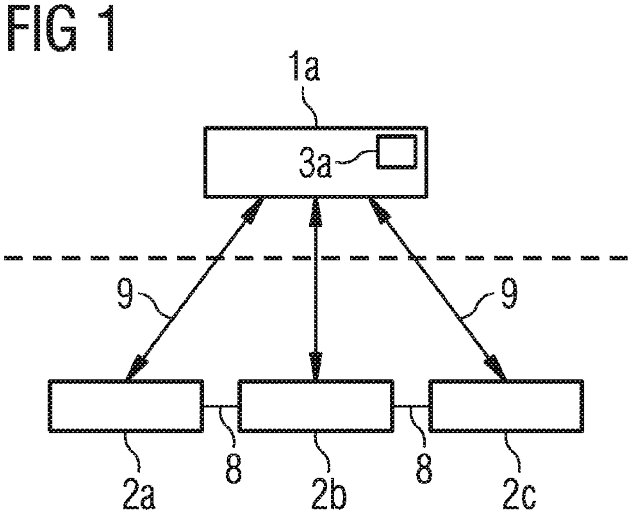
FIG. 1 shows a fluid-reservoir management system having three fluid reservoirs.

FIG. 1 is a schematic of a fluid-reservoir management system 1*a* having three fluid reservoirs 2*a*-2*c* embodied particularly as gas reservoirs. Fluid reservoirs 2*a*-2*c* are linked to each other via pipelines in a fluid network 8 so that fluid capacities can be transferred between fluid reservoirs 2*a*-2*c* through the pipelines. Each fluid reservoir 2*a*-2*c* is connected in a communication network 9 to fluid-reservoir management system 1*a*, in particular to a central computer unit 3*a* of fluid-reservoir management system 1*a*. All data, which is to say parameters of each fluid reservoir 2*a*-2*c*, in particular data about fluid capacity, pressures, prices of the fluid capacities, etc., is transmitted over said communication network 9. All information converges within fluid-reservoir management system 1*a*.

Figure 2:
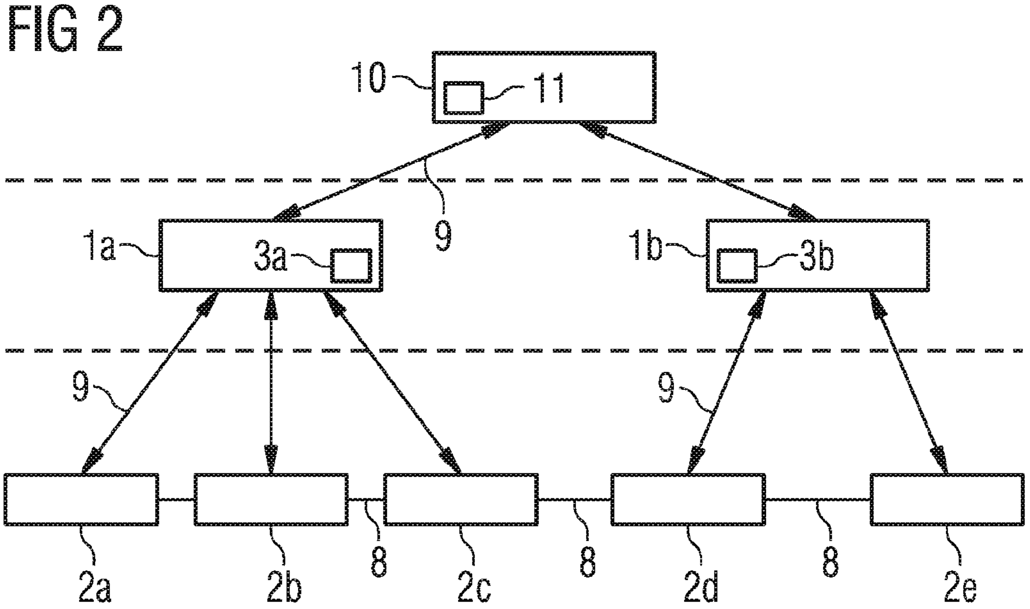
FIG. 2 shows a superordinate coordinating center and two fluid-reservoir management systems having respectively assigned fluid reservoirs.

FIG. 2 shows a fluid-reservoir management system similar to that shown in FIG. 1. However, in this case two fluid-reservoir management systems 1*a*, 1*b* are coupled to a superordinate coordinating center 10. Fluid-reservoir management systems 1*a*, 1*b*, for example, can therein serve as regional fluid-reservoir management systems. Superordinate coordinating center 10, which has a coordinating-computer unit 11, is linked to regional fluid-reservoir management systems 1*a*, 1*b* via communication network 9. That means that coordinating-computer unit 11 of superordinate coordinating center 10 is linked to central computer units 3*a*, 3*b* of the two fluid-reservoir management systems 1*a*, 1*b* for monitoring all the data and to perform central controlling. Fluid reservoirs 2*a*-2*c* of first fluid-reservoir management system 1*a* are linked to first fluid-reservoir management system 1*a* via communication network 9. The same applies to fluid reservoirs 2*d*, 2*e* of second fluid-reservoir management system 1*b*. Those are likewise linked to fluid-reservoir management system 1*b* via communication network 9. Fluid reservoirs 2*a*-2*e* are all interlinked via pipelines into a fluid network 8 so that fluid capacities can be exchanged between all fluid reservoirs 2*a*-2*e*.

Figure 3:
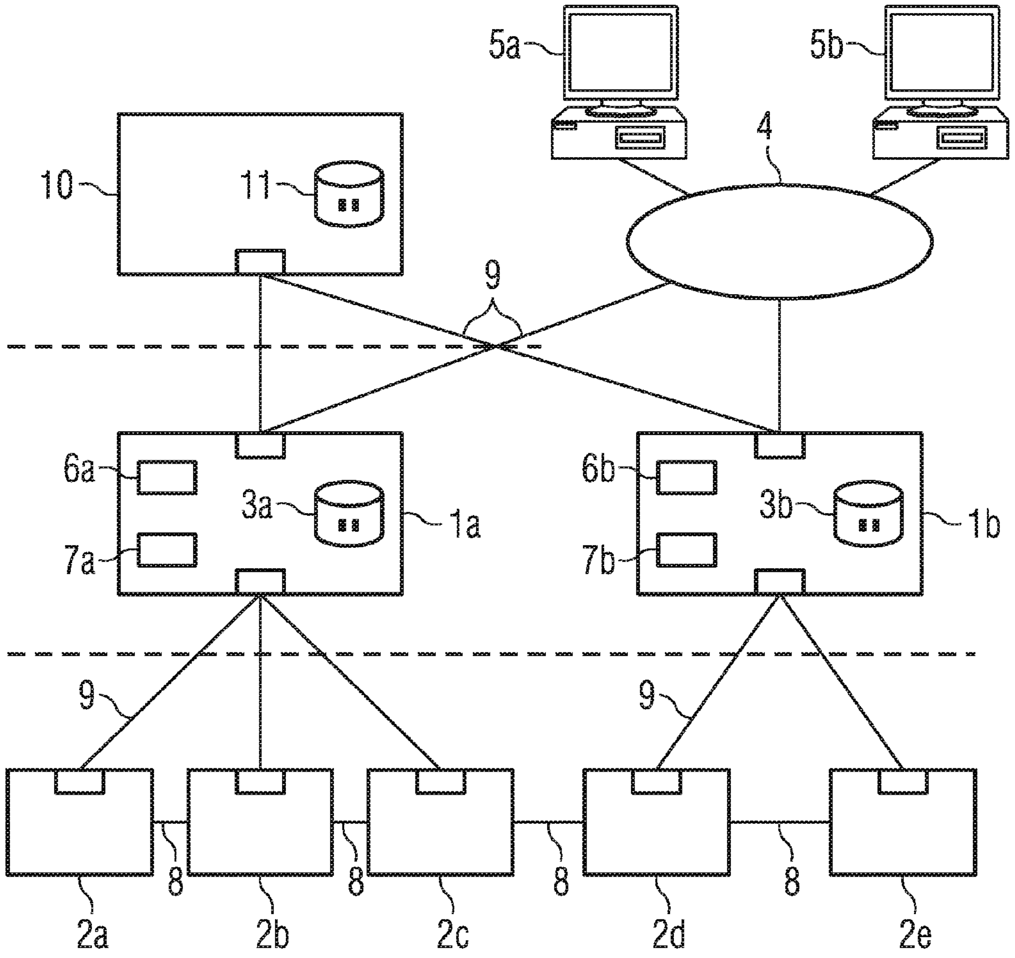
FIG. 3 shows another superordinate coordinating center and two fluid-reservoir management systems having respectively assigned fluid reservoirs.

FIG. 3 shows another exemplary variant of the fluid-reservoir management system or, as the case may be, of two fluid-reservoir management systems 1*a*, 1*b*. The two fluid-reservoir management systems 1*a*, 1*b* are likewise linked to a superordinate coordinating center 10 that has a coordinating-computer unit 11. Data is therein transmitted between coordinating-computer unit 11 of superordinate coordinating center 10 and central computer units 3*a*, 3*b* of fluid-reservoir management systems 1*a*, 1*b* via communication network 9. Central computer units 3*a*, 3*b* of each fluid-reservoir management system 1*a*, 1*b* are each embodied for coordinating orders to transfer fluid capacities between at least two fluid reservoirs 2*a*-2*e* as a function of results of comparisons performed by comparison units 6*a*, 6*b* and for forwarding the orders to relevant control device 7*a*, 7*b* for executing. Fluid-reservoir management systems 1*a*, 1*b* have a communication portal 4 in communication network 9, with communication portal 4 being linked to central computer units 3*a*, 3*b* of the two fluid-reservoir management systems 1*a*, 1*b*. The accessing of communication portal 4 is made possible via user interfaces 5*a*, 5*b*. The user interfaces are embodied particularly as personal computers or, as the case may be, computer units. It is, though, also conceivable for user interfaces 5*a*, 5*b* to be embodied as cell phones or PDAs. Communication portal 4 is embodied for transmitting orders to respective central computer units 3*a*, 3*b* of fluid-reservoir management systems 1*a*, 1*b* within the scope of accessing via user interfaces 5*a*, 6*b*. That means that via user interfaces 5*a*, 5*b*, users will be able to access communication portal 4 and hence computer units 3*a*, 3*b* of the two fluid-reservoir management systems 1*a*, 1*b*. They will thereby be able to monitor all the information and data in the fluid network 8 and enter orders to transfer fluid capacities.

Each fluid-reservoir management system 1*a*, 1*b* has a comparison unit 6*a*, 6*b* for comparing fluid capacities and for comparing parameters of fluid reservoirs 2*a*-2*c* or 2*d*-2*e* and of fluid network 8. The extent to which orders can be executed in parallel or consecutively is determined in comparison units 6*a*, 6*b* of respective fluid-reservoir management systems 1*a*, 1*b*. Comparison units 6*a*, 6*b* for that purpose have recourse to the information converging within central computer units 3*a*, 3*b*, in particular the data about the fluid capacities or, as the case may be, the respective parameters of individual fluid reservoirs 2*a*-2*e*. Each fluid-reservoir management system 1*a*, 1*b* furthermore has a control device 7*a*, 7*b* embodied for executing orders to transfer fluid capacities between at least two fluid reservoirs 2*a*-2*e*, with it being possible to enter the orders via user interfaces 5*a*, 5*b* of communication portal 4. That means that respective central computer unit 3*a*, 3*b* of fluid-reservoir management systems 1*a*, 1*b* is embodied for coordinating the orders to transfer fluid capacities between at least two fluid reservoir 2*a*-2*e* as a function of results of comparisons performed by comparison unit 6*a*, 6*b* and for forwarding the orders to control devices 7*a*, 7*b* for executing. Once an order has been received, central computer unit 3*a*, 3*b* of a fluid-reservoir management system 1*a*, 1*b* calculates as a function of the results of the comparisons performed by respective comparison unit 6*a*, 6*b* whether or, as the case may be, to what extent a submitted order can be executed. Before forwarding the orders to relevant control device 7*a*, 7*b*, each central computer unit 3*a*, 3*b* preferably reports back to the user or customer to indicate the extent to which the order can be met and when. If the customer agrees to the proposal made by central computer unit 3*a*, 3*b*, then respective central computer unit 3*a*, 3*b* will forward the order to respective control device 7*a*, 7*b*, which will thereupon initiate the relevant steps necessary for controlling relevant fluid reservoirs 2*a*-2*e* in order to execute the respective order. Respective control device 7*a*, 7*b* implements the signals accordingly and ensures that fluid capacities are transferred between at least two fluid reservoirs 2*a*-2*e* in specific amounts and at specific times. Respective control device 7*a*, 7*b* can therein control suitable blocking means, in particular valves, in fluid network 8 and in relevant fluid reservoirs 2*a*-2*e* so that fluid capacities can be transferred at the required times. Coordinating-computer unit 11 of superordinate coordinating center 10 checks whether the orders calculated by central computer units 3*a*, 3*b* of respective fluid-reservoir management systems 1*a*, 1*b* can be executed throughout fluid network 8 and will report back if applicable.

Communication network 9 can be variously embodied for transferring data between all the elements of the fluid network. Communication network 9 is in a possible variant embodied as a mobile-radio communication network. The respective elements in fluid-reservoir management system 1*a*, 1*b* are preferably interlinked via internet connections. It is furthermore conceivable for Ethernet connections, Modbuses, Profibuses, or similar bus systems to be used for transmitting data in communication network 9.

Figure 4:
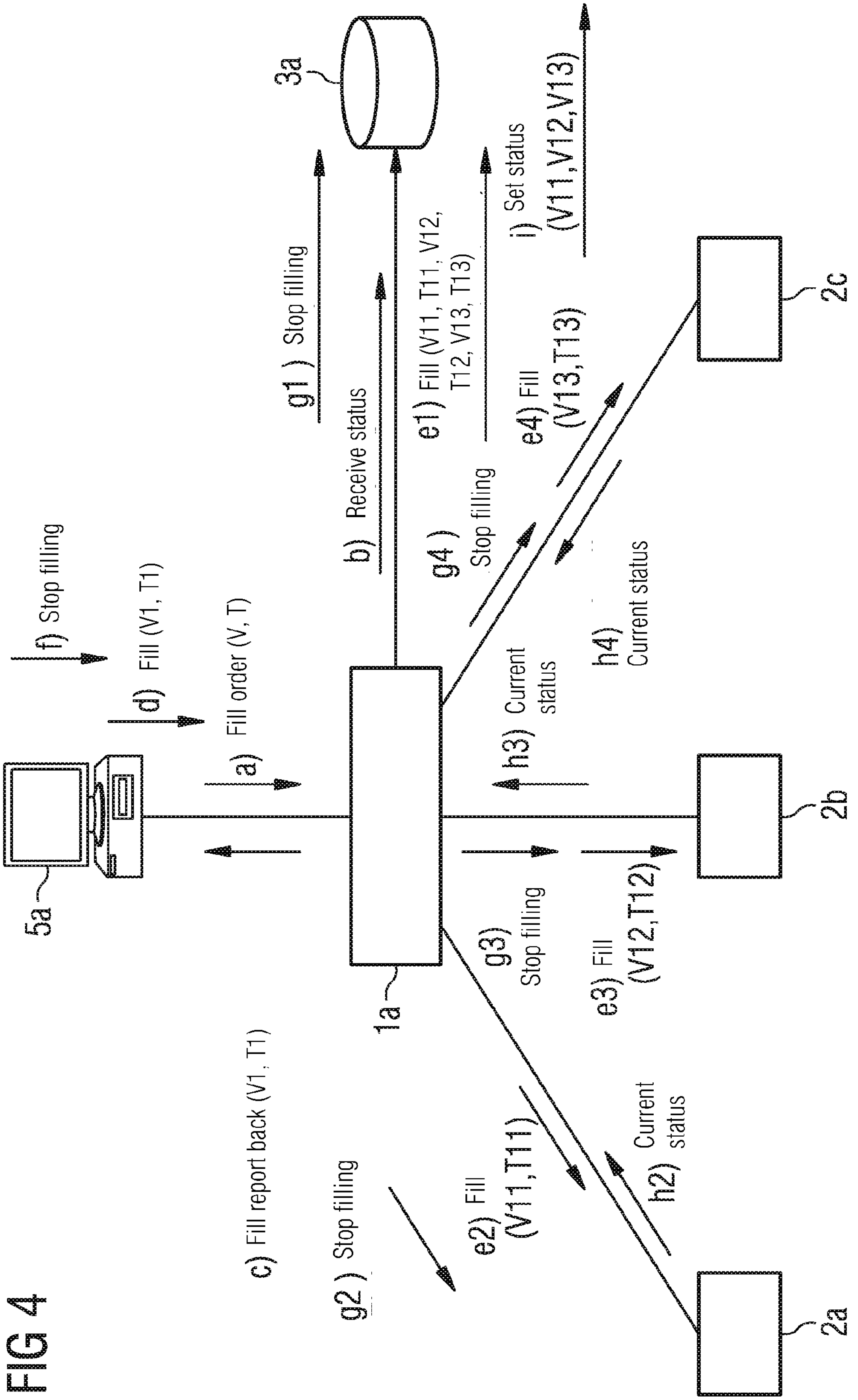
FIG. 4 is a flow diagram of an order for filling a fluid capacity.

Shown schematically in FIG. 4 is a data flow for the transfer of a fluid capacity in a fluid-reservoir management system 1*a*. An order for filling a fluid capacity is first entered via user interface 5*a*. Order a) for filling a specific volume V at a specific time T is transmitted over the communication network from user interface 5*a* to fluid-reservoir management system 1*a* and forwarded to central computer unit 3*a* of fluid-reservoir management system 1*a*. Central computer unit 3*a* receives the statuses b) of relevant fluid reservoirs 2*a*-2*c*. Central computer unit 3*a* or, as the case may be, fluid-reservoir management system 1*a* reports back to the customer with a filling report c) indicating how much volume V1 can be transferred at what time T1. The customer in turn provides feedback to fluid-reservoir management system 1*a* or, as the case may be, central computer unit 3*a* for filling d) specific volume V1 at specific time T1. The central computer unit 3*a* forwards corresponding orders e1) for filling the relevant volume to fluid reservoirs 2*a*-2*c* connected within the fluid network. That means that fluid reservoirs 2*a*-2*c* each individually receive a corresponding order from central computer unit 3*a* for filling a specific fluid capacity at a specific fluid time. Thus from central computer unit 3*a*, fluid reservoir 2*a* receives order e2) for filling volume V11 at time T11, fluid reservoir 2*b* receives order e3) for filling volume V12 at time T12, and fluid reservoir 2*c* receives order e4) for filling volume V13 at time T13. The customer can issue an order to stop filling the relevant fluid capacities via user interface 5*a*, see reference letter f). Said order is received by central computer unit 3*a*, which is indicated by reference letter/numeral g1). The central computer unit forwards the order to stop filling to relevant fluid reservoirs 2*a*-2*c*, see reference letters/numerals g2), g3), and g4). Respective fluid reservoirs 2*a*-2*c* return their current status, in particular all parameters relating to fluid reservoirs, to fluid-reservoir management system 1*a*. These items of information in turn converge within central computer unit 3*a* of fluid-reservoir management system 1*a*, which unit then stores the new statuses, see reference letter i).

Figure 5:
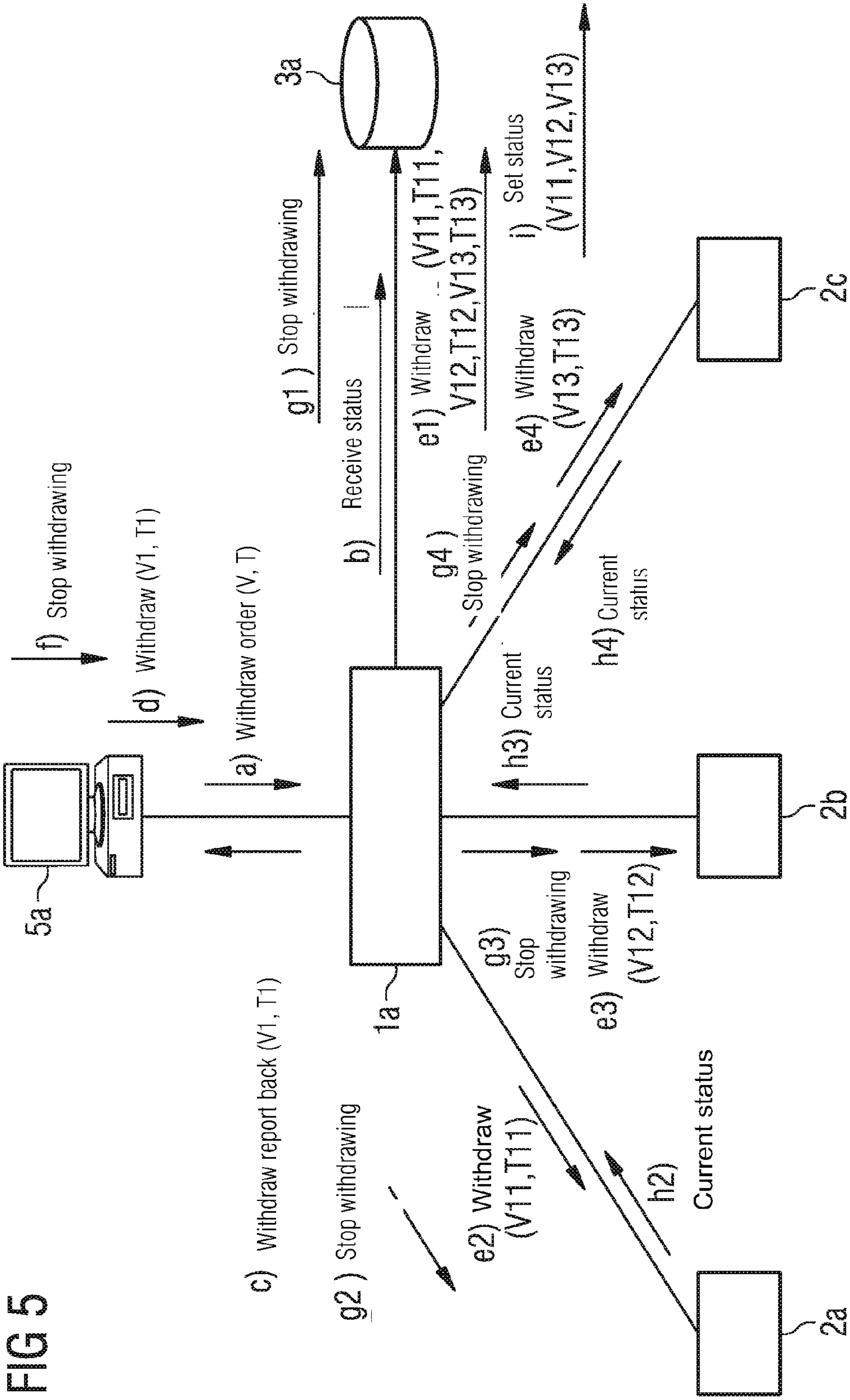
FIG. 5 is a flow diagram of an order for withdrawing a fluid capacity.

A similar scenario is shown schematically in FIG. 5. FIG. 5 shows the necessary instructions for withdrawing fluid capacities.

Generally speaking, a fluid-reservoir management system is a modular and adaptable system for transferring fluid capacities, in particular gas capacities, within a fluid network. The fluid-reservoir management system supports predicting and balancing within the fluid network. The fluid-reservoir management system is a solution that makes it possible to react flexibly to price differences within the fluid network. In particular the fluid-reservoir management system enables very simple remote actuating of the fluid reservoirs through access to the communication portal. Everyone can view the fluid network and the fluid capacities therein easily via the communication portal and place orders on the basis of the information provided thereby in order, for example, to dispose of or, as the case may be, receive fluid capacities. The fluid-reservoir management system reacts flexibly to relevant demand in the fluid network. All orders are therein coordinated via the fluid-reservoir management system's central computer unit, calculated, and forwarded to relevant control devices for executing. Thus the fluid-reservoir management system can in a simple manner report back to users, who have access via the communication portal, to indicate when and how an order can be fulfilled. In particular the users of the fluid-reservoir management system will in a simple and extremely fast manner receive feedback about the possibilities for exchanging fluid capacities throughout the fluid network. Thus users who in particular themselves possess one or more fluid reservoirs will be able to coordinate filling or withdrawing fluid capacities into or from their own fluid reservoirs. All users of the fluid-reservoir management system are bound to the data entered into the fluid-reservoir management system so that both the customer and the contractor will have relevant legal certainty. Since all users of the communication portal obtain information about each fluid reservoir connected to the fluid network, all users will find it very easy to plan their orders.

The fluid-reservoir management system, in particular the fluid-reservoir management system's communication portal, visualizes each fluid reservoir's storage capacity, for example. It is additionally possible to visualize details of pressures, in particular maximum pressures, and prices applying to each fluid reservoir. The fluid-reservoir management system can in particular display downtimes or times of non-use required for what is termed "switchover". Switchover relates to changing over between filling and withdrawing a fluid capacity into/from a fluid reservoir. Every user of fluid-reservoir management system can obtain predictions about future fluid demand via the communication portal. The fluid-reservoir management system, in particular the fluid-reservoir management system's central computer unit, calculates the demand for fluid capacities from different fluid reservoirs and distributes the requests, which is to say the orders, among the different fluid reservoirs. Users of the fluid-reservoir management system obtain all information about all fluid reservoirs within the fluid network online via access to the communication portal.

Users in particular also obtain information about compressors, dryers, pipelines, and blocking means within the fluid network. Users can in particular also obtain information about gas suppliers as well as about the individual statuses or stages of the fluid reservoirs connected to the fluid network. The fluid-reservoir management system's central computer unit calculates the demand for filling and withdrawing fluid capacities throughout the fluid network. The fluid-reservoir management system's central computer unit in particular calculates the time needed to transfer the relevant fluid capacities within the fluid network. The central computer unit therein takes account in particular of the time needed for changing over from withdrawing from to filling into a fluid reservoir. The fluid-reservoir management system is furthermore able to simulate future scenarios. All activities relating to the transfer of fluid capacities, gas in particular, can be displayed via the communication portal so that every user will be able to see what processes are currently taking place within the fluid network. The fluid-reservoir management system makes planning and predicting possible based on highly up-to-date data because via the communication network the central computer unit is always kept informed about the current statuses of each fluid reservoir connected to the fluid network.

The invention claimed is:

1. A fluid-reservoir management system for monitoring fluid capacities and controlling a transfer of fluid capacities within a fluid network, the fluid-reservoir management system comprising:

a plurality of fluid reservoirs for storing the fluid capacities, with the fluid reservoirs being linked to each other in the fluid network for transferring fluid capacities, a central computer unit provided in a communication network, with the fluid reservoirs being linked to the communication network for transmitting data to and from the central computer unit, a communication portal provided in the communication network, with the communication portal being linked to the central computer unit, a user interface for accessing the communication portal, with the communication portal being configured for conveying orders to the central computer unit within a scope of accessing, a comparison unit for comparing fluid capacities and for comparing parameters of the fluid reservoirs and of the fluid network, and a control device for executing orders to transfer fluid capacities between at least two fluid reservoirs, the orders entered via the user interface of the communication portal, wherein the central computer unit is configured for coordinating the orders to transfer fluid capacities between at least two fluid reservoirs as a function of results of comparisons performed by the comparison unit and for forwarding the orders to the control device for executing wherein two or more fluid-reservoir management systems are provided that are monitored and controlled by a superordinate coordinating center having at least one coordinating-computer unit linked to the central computer unit of each of the two or more fluid-reservoir management systems via the communication network, wherein the at least one coordinating-computer unit of the superordinate coordinating center provides a determination of the order validity throughout the fluid network, the orders calculated by central computer units of respective fluid-reservoir management systems.

2. The fluid-reservoir management system as claimed in claim 1, wherein the fluid-reservoir management system is configured for monitoring and controlling the transfer of fluid capacities from first fluid reservoirs belonging to fluid suppliers to second fluid reservoirs belonging to fluid recipients.

3. The fluid-reservoir management system as claimed in claim 1, wherein the central computer unit is configured for preventing cases of underbooking and/or overbooking fluid capacities in the fluid reservoirs via reports from the comparison unit.

4. The fluid-reservoir management system as claimed in claim 1, wherein the communication portal is embodied as an intranet portal or internet portal that is at least addressed via web interfaces.

5. The fluid-reservoir management system as claimed in claim 1, wherein the fluid reservoirs are overground or underground fluid reservoirs or pipelines.

6. The fluid-reservoir management system as claimed in claim 1, wherein the parameters of the fluid reservoirs and fluid network are pressures, fill levels, operating statuses, qualities of the fluid capacities, and flow rates.

7. The fluid-reservoir management system as claimed in claim 1, wherein, as a function of the results of the comparison of an actual status of the fluid reservoirs with their future order conditions that is calculated on the basis of the orders placed, the central computer unit instructs the control device to control the transfer of fluid capacities within a fluid network.

8. The fluid-reservoir management system as claimed in claim 1, wherein the orders are bookings, transfer orders, and/or reservations of fluid capacities.

9. The fluid-reservoir management system as claimed in claim 1, wherein the central computer unit is configured for receiving in parallel orders that arrive simultaneously or mutually overlap and wherein the control device is configured for executing the orders simultaneously or in an overlapping fashion.

10. The fluid-reservoir management system as claimed in claim 1, wherein the central computer unit is configured for selecting from the multiplicity of fluid reservoirs linked to the fluid network those that are suitable for executing an order.

11. The fluid-reservoir management system as claimed in claim 1, wherein the communication network includes bus systems via which the fluid reservoirs and central computer unit communicate with each other.

12. The fluid-reservoir management system as claimed in claim 11, wherein the bus systems include Profibus or Modbus systems.

13. A method for monitoring fluid capacities and controlling the transfer of fluid capacities within a fluid network, with a plurality of fluid reservoirs in which fluid capacities are stored being linked to each other in the fluid network for transferring fluid capacities, the method comprising:

transmitting data, including fluid capacities and parameters, of the fluid reservoirs and fluid network between the fluid reservoirs and central computer unit over a communication network that links the fluid reservoirs and central computer unit to each other, monitoring fluid capacities and parameters of the fluid reservoirs and fluid network and entering orders to transfer fluid capacities between at least two fluid reservoirs via a user interface of a communication portal connected to the central computer unit of the communication network, comparing, via a comparison unit, the fluid capacities and parameters of the fluid reservoirs and fluid network with each other and forwarding comparison results to the central computer unit, providing a superordinate coordinating center having at least one coordinating-computer unit linked to the central computer unit of each of two or more fluid-reservoir management systems via the communication network, monitoring and controlling the two or more fluid-reservoir management systems via the superordinate coordinating center, wherein the at least one coordinating-computer unit of the superordinate coordinating center provides a determination of an order validity throughout the fluid network, the orders calculated by central computer units of respective fluid-reservoir management systems, coordinating, via the central computer unit, the orders to transfer fluid capacities between at least two fluid reservoirs as a function of the results of the comparison performed by the comparison unit, and forwarding the orders to the control device for executing, and executing, via a control device, the orders received from the central computer unit to transfer fluid capacities between at least two fluid reservoirs.

14. The method as claimed in claim 13, wherein said method is implemented by a fluid-reservoir management system as claimed in claim 1.

15. The method as claimed in claim 13, comprising notifying a user who entered the order via the user interface after an order has been entered via the user interface and/or on completion of a transfer of at least one fluid capacity from one fluid reservoir to another fluid reservoir.

16. The method as claimed in claim 13, further comprising calculating, via the central computer unit, times when a new order can be executed as a function of the capacities and parameters of the fluid reservoirs and of existing orders, wherein overbooking and/or underbooking of fluid capacities in the fluid reservoirs are avoided.

17. The method as claimed in claim 13, comprising enabling providers of fluid capacities and buyers of fluid capacities to access the communication portal of the communication network simultaneously and mutually independently via different user interfaces in order to monitor the current fluid capacities and parameters of the fluid reservoirs and fluid network and to submit orders.

* * * * *